United States Patent [19]

Korinsky

[11] Patent Number: 5,406,451
[45] Date of Patent: Apr. 11, 1995

[54] HEAT SINK FOR A PERSONAL COMPUTER

[75] Inventor: George K. Korinsky, The Woodlands, Tex.

[73] Assignee: Comaq Computer Corporation, Houston, Tex.

[21] Appl. No.: 76,467

[22] Filed: Jun. 14, 1993

[51] Int. Cl.⁶ .............................................. H05K 7/20
[52] U.S. Cl. .................................... 361/697; 165/80.3; 174/16.3; 257/722; 361/687
[58] Field of Search ....................... 174/16.3; 165/80.3, 165/122, 182, 185; 361/687–690, 694, 695, 697, 702, 704, 709; 257/706, 707, 713, 722

[56] References Cited

U.S. PATENT DOCUMENTS

| | | | |
|---|---|---|---|
| 3,829,740 | 8/1974 | Beasley | 361/697 |
| 4,103,737 | 8/1978 | Perkins | 174/16.3 |
| 4,707,726 | 11/1987 | Tinder | 174/16.3 |

FOREIGN PATENT DOCUMENTS 8505756 12/1985 WIPO .................................. 174/16.3

OTHER PUBLICATIONS

Cooling Elect. Equipment, Gaunt, IBM Tech Discl Bull vol. 20 No 6 Nov. 1977 pp. 3428.

*Primary Examiner*—Gerald P. Tolin
*Attorney, Agent, or Firm*—L. Jon Lindsay

[57] ABSTRACT

A computer system utilizes a heat sink which optimizes the benefits of both linear airflow and turbulent airflow within the computer housing. The heat sink has rows of metal fingers extending from a metal sheet. A fan generates linear airflow within the housing. The heat sink is attached to a heat producing element such that the rows of fingers are placed parallel to the direction of airflow in the housing. The fingers are spaced apart within a single row to generate turbulence in the airflow, and the rows are spaced apart to prevent the turbulence of one row from interfering with the turbulence of an adjacent row.

2 Claims, 3 Drawing Sheets

HEAT SINK FOR A PERSONAL COMPUTER

BACKGROUND OF THE INVENTION

The invention relates to heat sinks. More particularly, the invention relates to heat sinks used in personal computer systems.

Nearly all computer systems and most electrical power systems in the world have at least one element that produces heat. Frequently, this heat must be dissipated to the surrounding air. If this heat is not adequately dissipated, the heat may damage the heat-producing element, itself, or one of the nearby elements.

Sometimes, the heat-producing element is too small and does not conduct heat well enough to dissipate the heat as rapidly as necessary. In this case, it is necessary to attach a heat sink to the element. The heat sink, usually made of metal, has a much larger surface area than the element has and conducts heat very well. The excellent heat conduction properties of the heat sink allow it to quickly conduct heat away from the element, and the large surface area allows it to rapidly dissipate the heat to the surrounding air.

As the air surrounding the heat sink is heated up, it is necessary to blow the air away, so that there will always be cool air surrounding the heat sink. Therefore, many electrical systems provide a fan to blow air across the heat sink. The air blown by a fan is very turbulent due to the vortices created in the air by the spinning fan blades and by the interaction of the moving air with the non-moving air after the air passes through the fan. If the fan blows directly on the heat sink, then the turbulence aids in the dissipation of heat. This turbulence permits the air to circulate around the heat sink so the air can receive more heat than laminar, or linearly-flowing, air would receive. Additionally, this turbulence permits the heated air to mix with the cooler air, so the heat can diffuse through the air more quickly.

A system wherein the fan blows directly onto the heat-producing element experiences a localization of air pressure in the path where the fan blows. Other areas within the system receive less airflow, so heat-producing elements in those areas do not cool as easily. In a system enclosed within a housing unit, as a personal computer system is enclosed within a central processing unit (CPU) box, the fan does not need to blow directly onto the heat-producing elements. In this case, the fan may be situated to blow air out of the housing unit instead of into the housing unit. The passage of air through the unit, therefore, will be governed by the position of air intake vents in the side of the housing and by the position of elements within the housing. Air pressure is thus equalized throughout most of the housing because there is no particular path in which the fan blows, so the system cools more evenly. Additionally, more air is circulated through the housing unit than with an inward-blowing fan. With an inward-blowing fan here is high pressure inside the housing unit. This high pressure causes a back-pressure against the fan which prevents the fan from blowing air more efficiently than it would otherwise be capable of blowing. An outward-blowing fan creates a vacuum within the housing unit which may reduce the efficiency of the fan, but it is easier to compensate for this vacuum with additional vents in the side of the housing than it is to compensate for the high pressure of an inward-blowing fan. Therefore, air movement is more efficient with an outward-blowing fan than with an inward-blowing fan.

Although cooling may be more evenly distributed within a personal computer system in which the fan blows out of the box, the advantages from the turbulence created by the fan may be lost. Since the fan in this situation creates no vortices in the air within the housing, the airflow is much more laminar, or linear. The objects within the housing may create some disturbances in the airflow, but since the airflow is more evenly distributed within the housing, the turbulence thus created is not as significant as that created in the path of an inward-blowing fan. The air, therefore, does not circulate around the heat-producing elements very readily and the hot air does not quickly mix with the cooler air.

Therefore, there is a need to provide an electrical system housing and a heat sink which, together, take the benefits of an outward blowing fan (evenly distributed laminar airflow and greater airflow) and add the benefits of turbulence to the airflow.

To date, developments in heat sinks have been in two general areas: increasing the mass of the heat sink and increasing the surface area of the heat sink. These two development criteria have, of course, been offset by the constraints of the system in which the heat sink is to be utilized, e.g. available space.

Generally, a more massive object can conduct more heat across its length, and an object with more surface area can dissipate more heat to the surrounding air. The teaching, therefore, has been to build the most massive heat sink with the most surface area, so it can conduct more heat to its surface where the heat can be dissipated rapidly. No one, however, has yet optimized the configuration of the heat sink with the benefits of an outward-blowing fan and turbulence in the airflow.

FIG. 1 shows a cross section of a prior art heat sink 110 with a lot of mass and a large surface area. There are many heat sinks of this general type. This particular heat sink 110 is offered as an example of the problems inherent in this type of heat sink. The heat sink 110 in this case is an elongated metal member whose cross section at any point is that shown in FIG. 1. In heat sink 110, the cross section must be situated perpendicular to the direction of airflow so that air travels through channels 112 defined generally by planar members 114. The airflow, in order to flow through the channels 112, should ideally be laminar. Turbulent air would not flow well through the channels 112, so the advantages of turbulence are lost with this type of heat sink.

Additionally, this heat sink 110 is fabricated by a process of extrusion. This process requires extremely high pressure to pass the metal through the hole having the cross section shown in FIG. 1. After the extrusion, there is the additional finishing and straightening processes to be performed on this type of heat sink. Therefore, this process is extremely expensive and time consuming.

FIG. 2 shows a side view of another prior art heat sink 220 having a row of straight fingers 222 and a row of bent fingers 224. Heat sink 220 takes advantage somewhat of the benefits of the turbulence. The rows of fingers 222 and 224 permit turbulent air to circulate around them, but the prior art does not teach the optimization of the benefits of turbulence. The teaching of the heat sink in FIG. 2 requires that the rows of fingers 222 and 224 be too close together to permit air to circulate freely. Air circulating around one row of fingers interferes with air circulating around the other row. In laminar airflow, turbulence is generated in the air as it flows past the rows of fingers 222 and 224, but the turbulence generated by one row of fingers interferes with the turbulence around the other row reducing the efficiency of the circulating and mixing effects of turbulence, so the circulating and mixing benefits of turbulence are not optimized. Heat sink 220 may be placed in the airflow path of an inward-blowing fan, thus receiving added turbulence, but the benefits of an outward-blowing fan are lost, and it is generally accepted that this type of heat sink is not designed for use in turbulent airflow.

Another problem with the prior art heat sink 220 in FIG. 2 involves its method of fabrication. The sharp bend in the base 226 of the row of fingers 224 can produce necking in the base 226. Necking is the stretching and narrowing of the metal due to the bending procedure. Necking causes microscopic stress fractures in the metal in the base 226. These microscopic stress fractures impede the conduction of heat through the base 226 to the row of fingers 224. Thus, the efficiency of the heat sink 220 is reduced. Additionally, the narrowing of the metal provides less mass at the base 226, so less heat is conducted through the base 226.

SUMMARY OF THE INVENTION

It is an object of the present invention to provide a heat sink for a computer system that optimizes the benefits of linear airflow and turbulent airflow.

A computer system incorporating a heat sink according to the present invention as claimed has the heat sink disposed within the housing of the system in a region of substantially linear airflow caused by an outward-blowing fan. The heat sink is attached to a heat-producing element, such as those within the power supply of the system.

The heat sink has a flat metal sheet for a base and several long fingers extending from one or more edges of the sheet. These fingers are arranged in rows, each row being bent in a different angle so that the tips of one row of fingers are spaced apart from the tips of the next row of fingers.

The rows of fingers are situated in the a direction parallel to the direction of the linear airflow. Each finger in a row is spaced apart from the other fingers in that same row such that, as the linearly flowing air passes from one finger to the next, turbulence is generated in the airflow. This turbulence allows the air to swirl around the fingers, thus allowing the air to receive more heat from the fingers. This turbulence also allows the air to mix, thus diffusing the heat more rapidly through the air. Each row of fingers is angled such that the turbulence generated in the airflowing across one row of fingers will not interfere with the turbulence generated in the airflowing across an adjacent row of fingers.

The heat sink is manufactured with only slight bends in the metal to create the additional rows of fingers, thus preventing the creation of microscopic stress fractures in the metal and avoiding the problems of necking, so there is virtually no deformation of the metal.

DETAILED DESCRIPTION OF THE PREFERRED EMBODIMENT

Figure 3:
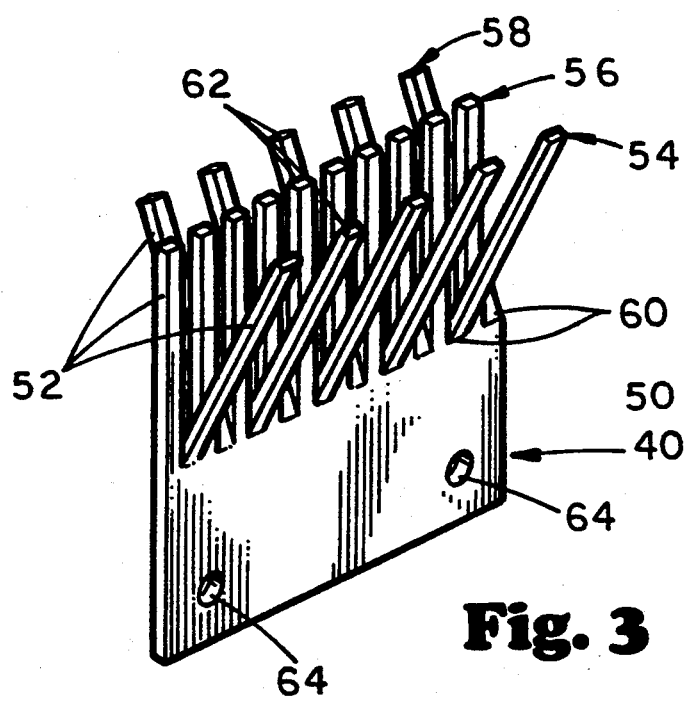
FIG. 3 is a front, left side, top perspective view of a heat sink incorporating the present invention.
Figure 4:
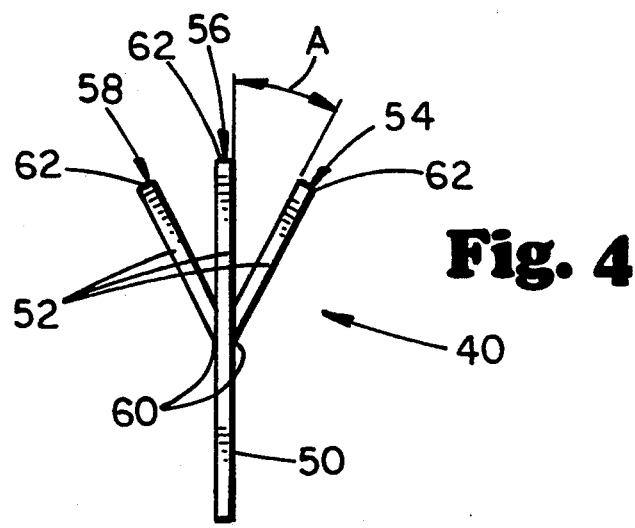
FIG. 4 is a front elevational view of the heat sink shown in FIG. 3.
Figure 5:
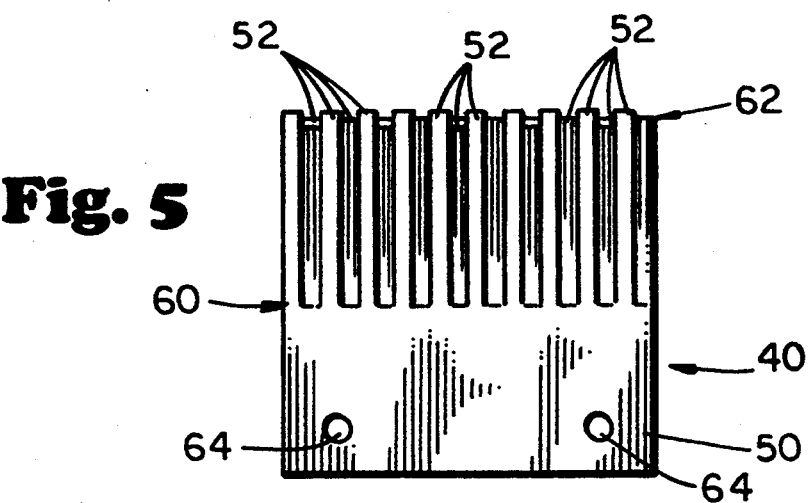
FIG. 5 is a left side elevational view of the heat sink shown in FIG. 3.
Figure 6:
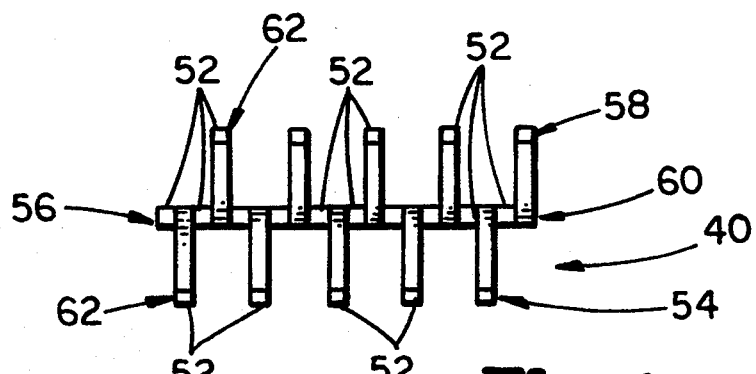
FIG. 6 is a top plan view of the heat sink shown in FIG. 3.

FIG. 3 shows a heat sink 40 according to the present invention. FIGS. 4, 5 and 6 show heat sink 40 in different views for clarity. Heat sink 40 has a metal sheet 50 and fingers 52 protruding from one edge of the metal sheet 50. The fingers 52 are bent to form several rows 54, 56 and 58.

Heat sink 40 has three rows 54, 56 and 58 of fingers 52 in the preferred embodiment, but any number of rows may be implemented so long as the following characteristics are maintained. The bend in the base 60 of each finger 52 in rows 54 and 58 is of sufficient angle A and the size of all fingers 52 is of sufficient length such that the tips 62 of the fingers 52 in any single row are far enough away from the tips 62 of the fingers 52 of any other row such that airflowing across one row does not interfere with airflowing across an adjacent row.

In the preferred embodiment, the height of the metal sheet 50 is approximately 1.1 inches and the length of the fingers 52 is approximately 1.5 inches. Thus, the aspect ratio of the height of the metal sheet 50 to the length of the fingers is approximately 1:1.3 to 1:1.5. The dimensions of the cross section of one of the fingers 52 are approximately 0.118 in.×0.14 in. Also, in the preferred embodiment, the distance between row 56 and either of rows 54 and 58 is between 0.4 and 0.7 inches, and the angle A of the bend in the base 60 of the fingers 52 is approximately 20 degrees. These dimensions are all mere approximations, and a person of ordinary skill in the relevant art will known that it is possible to use other dimensions without departing from the spirit of the invention so long as the above characteristics are maintained.

Holes 64 are used for fasteners to couple the heat sink to any heat producing element. The fasteners may be of any type, including studs which permanently seal the holes 64. Clearly, the holes 64 may be of any size, shape, number or location as may be dictated by the constraints of the type of fastener which is used and the environment in which the heat sink 40 is used.

Figure 7:
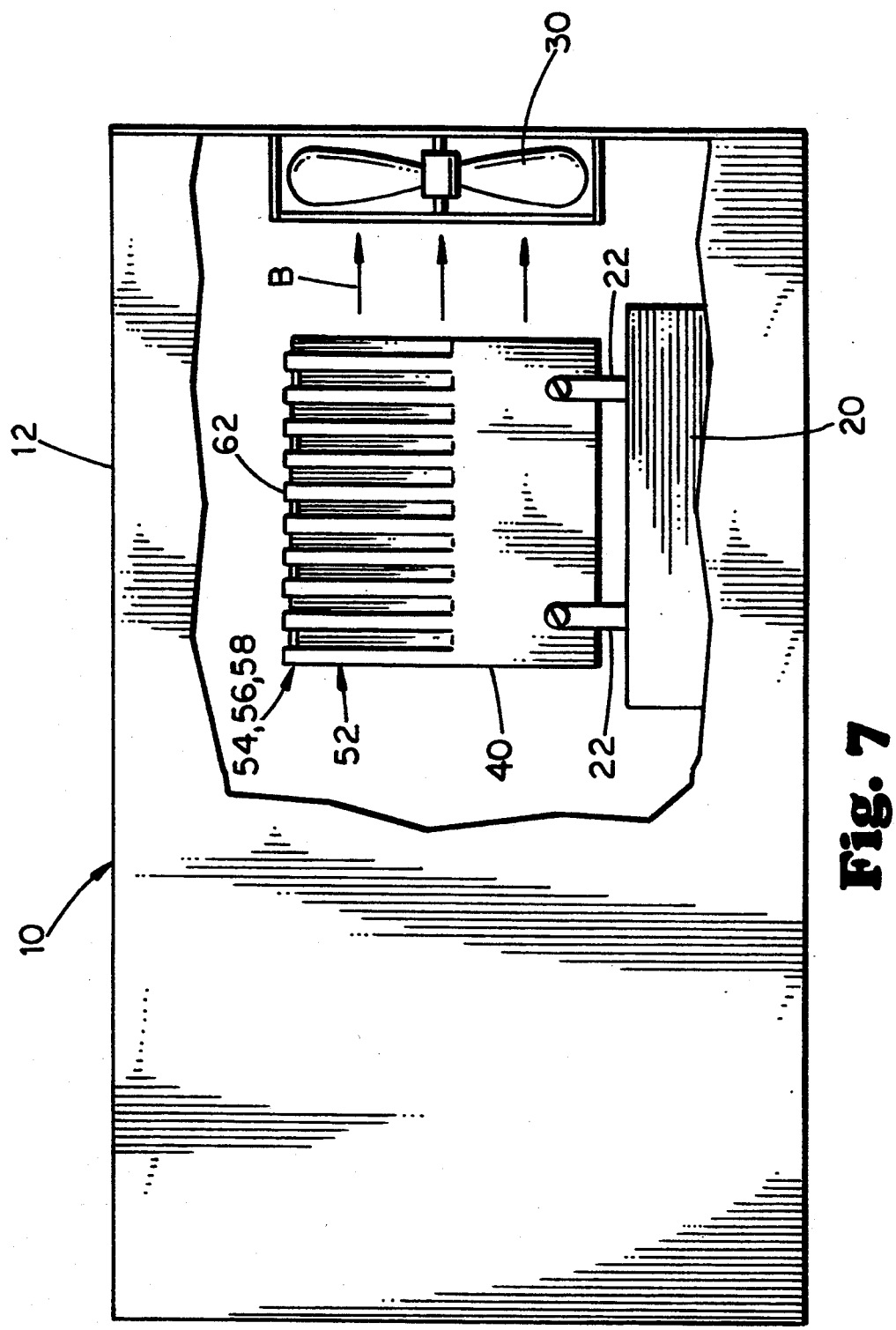
FIG. 7 is a side elevational view of a computer system with a cut-away section showing the heat sink of FIG. 3 disposed within the housing of a computer system incorporating the present invention.

FIG. 7 shows a computer system 10 with a heat sink 40 coupled to a heat producing element 20 by fasteners 22. Computer system 10 also includes an outward-blowing fan 30, which circulates air inside the housing 12 of computer system 10 in the direction of arrows B. This airflow is substantially linear, or laminar. Heat sink 40 is situated inside housing 12 such that rows 54, 56 and 58 are parallel to the linear flow of air in the direction of arrows B. The person of ordinary skill in the art will note that linear airflow may be created within the housing 12 in areas and directions other than that depicted in FIG. 7, and that the spirit of the invention may be maintained by placing the heat sink 40 anywhere in the airflow within a housing 12 so long as the rows 54, 56 and 58 are substantially parallel to the direction of linear airflow.

Heat sink 40 takes advantage of the benefits of both linear and turbulent airflow by creating its own turbulence in a substantially linear airflow environment, such as that shown in FIG. 7. Turbulence is generated in the airflow as the airflows across the first finger 52 in a row, and since the rows 54, 56 and 58 are substantially parallel to the airflow, this turbulence permits greater circulation of the air around all of the following fingers 52. The fingers 52 in a row 54, 56 or 58 are spaced far enough apart that vortices in the turbulent air are allowed to form between each finger 52 so that the air can actually circulate between the fingers 52 instead of merely slipping past the outside edges of the fingers 52. Additionally, the rows 54, 56 and 58 are spaced far enough apart that the turbulence generated in the airflow near the tips 62 of the fingers 52 in one row will not interfere with the turbulence generated in the airflow near the tips 62 of the fingers 52 of an adjacent row.

Figure 1:
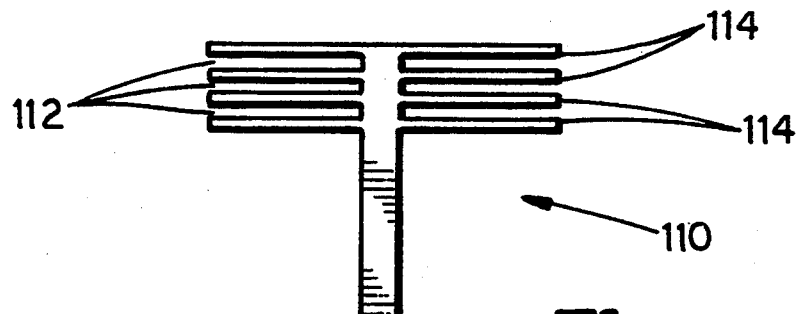
FIG. 1 is a drawing of a prior art heat sink.
Figure 2:
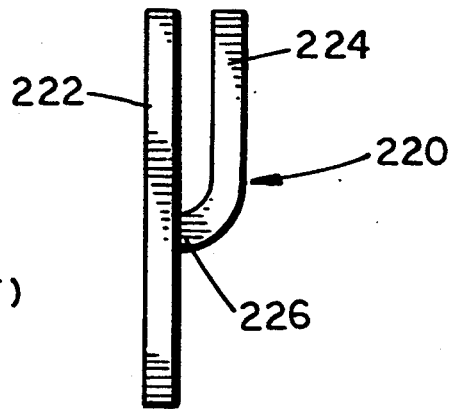
FIG. 2 is a drawing of another prior art heat sink.

Heat sink 40 is formed by only slightly bending the metal to form the additional rows 54, 58 of fingers 52. In the preferred embodiment, only every other finger 52 is bent during stamping, and every other bent finger 52 is bent in a different direction to form a different row 54 or 58. Thus, half of the finger 52 remain unbent in the center row 56. In this manner, three rows can be formed without risking bending too many fingers 52 and causing microscopic stress fractures or necking in the bases 60. However, the angle A is so slight, compared to the sharp bend in the base 226 of the finger 224 shown in the prior art of FIG. 2, that relatively little deformation is caused in the base 60 of fingers 52. Additionally, three rows of fingers 52 are used instead of two rows, so the heat sink 40 can receive more air.

What is claimed is:

1. A personal computer having a housing comprising:
   at least one heat-producing element disposed within the housing;
   a fan situated within the housing to generate laminar airflow in a region adjacent to the at least one heat producing element; and
   a heat sink comprising:
      a substantially planar substantially rectangular metal sheet having a first edge, a second edge, and third edge and a fourth edge;
      a first row of a plurality of substantially linear fingers arranged in spaced apart relationship, each finger having a first end and a second end, the first end being connected to the first edge of the metal sheet at a first angle with the plane of the metal sheet, the first row being substantially coextensive with the length of the first edge; and
      a second row of a plurality of substantially linear fingers arranged in spaced apart relationship, each finger having a first end and a second end, the first end being connected to the first edge of the metal sheet at a second angle with the plane of the metal sheet, the second angle being different from the first angle, the second row being substantially coextensive with the length of the first edge, the substantially linear fingers of the second row being interdigitally interspersed with the substantially linear fingers of the first row;
   the heat sink being connected to the at least one heat producing element and disposed within the laminar airflow region such that each of the rows is parallel to the direction of the flow of air;
   the fingers of the first row being spaced apart such that turbulence is generated in the airflow across the first row as the airflows from one finger to the next;
   the fingers of the second row being spaced apart such that turbulence is generated in the airflow across the second row as the airflows from one finger to the next;
   the second ends of the plurality of fingers to the first row spaced apart from the second ends of the plurality of fingers of the second row such that the turbulence generated in the airflow by the first row does not interfere with the airflow across the second row and the turbulence generated in the airflow by the second row does not interfere with the airflow across the first row;
   whereby heat is conducted through the metal sheet to the plurality of fingers and dissipated to the air.

2. The personal computer of claim 1 wherein the heat sink further comprises:
   a third row of a plurality of substantially linear fingers arranged in spaced apart relationship, each finger having a first end and a second end, the first end being connected to the first edge of the metal sheet at a third angle with the plane of the metal sheet, the third angle being different from the first angle and from the second angle, the third row being substantially coextensive with the length of the first edge, the substantially linear fingers of the third row being interdigitally interspersed with the substantially linear fingers of the first row and of the second row;
   the fingers of the third row being spaced apart such that turbulence is generated in the airflow across the third row as the airflows from one finger to the next;
   the second ends of the plurality of fingers of the third row being spaced apart from the second ends of the plurality of fingers of the first row and of the second row such that the turbulence generated in the airflow by the third row does not interfere with the airflow across the first row or the second row and the turbulence generated in the airflow by the first row and the second row does not interfere with the airflow across the third row.

* * * * *

UNITED STATES PATENT AND TRADEMARK OFFICE
CERTIFICATE OF CORRECTION

PATENT NO. :     5,406,451

DATED      :     Apr. 11, 1995

INVENTOR(S) :    George K. Korinsky

It is certified that error appears in the above-identified patent and that said Letters Patent is hereby corrected as shown below:

Title page, item [73],
Please change the name of the Assignee from "Comaq Computer Corporation" to --Compaq Computer Corporation--.

Signed and Sealed this

Twenty-first Day of November, 1995

Attest:

BRUCE LEHMAN

*Attesting Officer*      *Commissioner of Patents and Trademarks*